United States Patent
Valfridsson et al.

(10) Patent No.: US 10,633,232 B2
(45) Date of Patent: Apr. 28, 2020

(54) FLOOR CONVEYOR

(71) Applicant: Toyota Material Handling Manufacturing Sweden AB, Mjölby (SE)

(72) Inventors: Göran Valfridsson, Mjölby (SE); Terence Rogers, Linköping (SE)

(73) Assignee: Toyota Material Handling Manufacturing Sweden AB, Mjolby (SE)

(*) Notice: Subject to any disclaimer, the term of this patent is extended or adjusted under 35 U.S.C. 154(b) by 144 days.

(21) Appl. No.: 15/650,143

(22) Filed: Jul. 14, 2017

(65) Prior Publication Data
US 2018/0016125 A1 Jan. 18, 2018

(30) Foreign Application Priority Data
Jul. 14, 2016 (EP) .................... 16179516

(51) Int. Cl.
| | | |
|---|---|---|
| *B66F 9/075* | (2006.01) | |
| *B66F 9/06* | (2006.01) | |
| *B62D 5/04* | (2006.01) | |
| *B66F 17/00* | (2006.01) | |

(52) U.S. Cl.
CPC .......... *B66F 9/0755* (2013.01); *B62D 5/0457* (2013.01); *B66F 9/063* (2013.01); *B66F 9/07509* (2013.01); *B66F 9/07568* (2013.01); *B66F 9/07581* (2013.01); *B66F 17/003* (2013.01)

(58) Field of Classification Search
CPC .. B66F 9/0755; B66F 9/07568; B66F 17/003; B66F 9/07509; B66F 9/07581; B66F 9/063; B62D 5/0457
See application file for complete search history.

(56) References Cited

U.S. PATENT DOCUMENTS

| | | | |
|---|---|---|---|
| 4,077,486 A | 3/1978 | Blakeslee et al. | |
| 4,318,451 A | 3/1982 | Liggett | |
| 4,464,659 A | 8/1984 | Bergqvist | |
| 4,733,740 A | 3/1988 | Bigowsky et al. | |

(Continued)

FOREIGN PATENT DOCUMENTS

| | | |
|---|---|---|
| EP | 0237878 A2 | 9/1987 |
| EP | 1462880 A2 | 9/2004 |

(Continued)

OTHER PUBLICATIONS

The extended search report from the European Patent Office, dated Jan. 27, 2017, 3 Pages, for European Patent Application No. 16179516.6.

(Continued)

*Primary Examiner* — Yuen Wong
(74) *Attorney, Agent, or Firm* — Quarles & Brady LLP (57) ABSTRACT

Systems and methods for a floor conveyor include a sensor device and a control unit, wherein the control unit is operable to control the travel functions of the floor conveyor, wherein the sensor device is arranged to be able to provide the control unit with sensor data, wherein the sensor device is arranged such that it can detect objects in a plane. The plane is arranged to a have a follow section and a steer away section. And the floor conveyor is arranged such that it can determine an object to follow.

12 Claims, 10 Drawing Sheets

(56) References Cited

U.S. PATENT DOCUMENTS

| | | | |
|---|---|---|---|
| 5,107,946 A | 4/1992 | Kamimura et al. | |
| 5,111,401 A | 5/1992 | Everett, Jr. et al. | |
| 5,545,960 A | 8/1996 | Ishikawa | |
| 5,570,285 A | 10/1996 | Asaka et al. | |
| 5,602,425 A | 2/1997 | Wilhelmi et al. | |
| 5,684,696 A | 11/1997 | Rao et al. | |
| 5,796,354 A | 8/1998 | Cartabiano et al. | |
| 5,913,919 A | 6/1999 | Bauer et al. | |
| 5,938,710 A | 8/1999 | Lanza et al. | |
| 5,939,986 A | 8/1999 | Schiffbauer et al. | |
| 5,976,354 A | 11/1999 | Powers et al. | |
| 6,038,501 A | 3/2000 | Kawakami | |
| 6,173,215 B1 | 1/2001 | Sarangapani | |
| 6,338,013 B1 | 1/2002 | Ruffner | |
| 6,481,525 B1 | 11/2002 | Bloch et al. | |
| 6,564,906 B1 | 5/2003 | Haack et al. | |
| 6,595,306 B2 | 7/2003 | Trego et al. | |
| 6,681,638 B2 | 1/2004 | Kazerooni et al. | |
| 6,694,233 B1 | 2/2004 | Duff et al. | |
| 6,784,800 B2 | 8/2004 | Orzechowski | |
| 6,883,625 B2 | 4/2005 | Trego et al. | |
| 6,938,720 B2 | 9/2005 | Menjak et al. | |
| 6,950,035 B2 | 9/2005 | Tanaka et al. | |
| 7,017,689 B2 | 3/2006 | Gilliland et al. | |
| 7,124,027 B1 | 10/2006 | Ernst, Jr. et al. | |
| 7,211,980 B1 | 5/2007 | Bruemmer et al. | |
| 7,259,662 B2 | 8/2007 | Lewis | |
| 7,430,455 B2 | 9/2008 | Casey et al. | |
| 7,860,653 B2 | 12/2010 | Joe et al. | |
| 7,931,431 B2 | 4/2011 | Benedict et al. | |
| 8,020,657 B2 | 9/2011 | Allard et al. | |
| 8,072,309 B2 | 12/2011 | Kraimer et al. | |
| 8,193,903 B2 | 6/2012 | Kraimer et al. | |
| 8,195,366 B2 | 6/2012 | McCabe et al. | |
| 8,392,065 B2 | 3/2013 | Tolstedt et al. | |
| 8,452,464 B2 | 5/2013 | Castaneda et al. | |
| 8,577,551 B2 | 11/2013 | Siefring et al. | |
| 8,725,317 B2 | 5/2014 | Elston et al. | |
| 8,725,362 B2 | 5/2014 | Elston et al. | |
| 8,725,363 B2 | 5/2014 | Elston et al. | |
| 8,731,777 B2 | 5/2014 | Castaneda et al. | |
| 8,970,363 B2 | 3/2015 | Kraimer et al. | |
| 9,002,581 B2 | 4/2015 | Castaneda et al. | |
| 9,082,293 B2 | 7/2015 | Wellman et al. | |
| 9,122,276 B2 | 9/2015 | Kraimer et al. | |
| 9,207,673 B2 | 12/2015 | Pulskamp et al. | |
| 9,493,184 B2 | 11/2016 | Castaneda et al. | |
| 9,522,817 B2 | 12/2016 | Castaneda et al. | |
| 9,645,968 B2 | 5/2017 | Elston et al. | |
| 9,651,930 B2 | 5/2017 | Nakatani et al. | |
| 9,908,527 B2 | 3/2018 | Elston et al. | |
| 10,179,723 B2 | 1/2019 | Kraimer et al. | |
| 2002/0035331 A1 | 3/2002 | Brockway et al. | |
| 2002/0163495 A1 | 11/2002 | Doynov | |
| 2002/0178830 A1 | 12/2002 | Kazerooni et al. | |
| 2005/0017858 A1 | 1/2005 | Gross | |
| 2005/0052412 A1 | 3/2005 | McRae et al. | |
| 2005/0247508 A1 | 11/2005 | Gilliland et al. | |
| 2006/0125806 A1 | 6/2006 | Voyles et al. | |
| 2006/0180381 A1 | 8/2006 | Sonderegger et al. | |
| 2006/0229774 A1 | 10/2006 | Park et al. | |
| 2006/0238156 A1 | 10/2006 | Kim | |
| 2006/0250255 A1 | 11/2006 | Flanagan | |
| 2006/0276958 A1 | 12/2006 | Crumbaugh | |
| 2007/0112461 A1 | 5/2007 | Zini et al. | |
| 2007/0193798 A1 | 8/2007 | Allard et al. | |
| 2008/0071429 A1 | 3/2008 | Kraimer et al. | |
| 2008/0129445 A1 | 6/2008 | Kraimer et al. | |
| 2009/0032560 A1 | 2/2009 | Strandberg et al. | |
| 2009/0076664 A1 | 3/2009 | McCabe et al. | |
| 2010/0014555 A1 | 1/2010 | Twerdochlib | |
| 2010/0063680 A1 | 3/2010 | Tolstedt et al. | |
| 2010/0106344 A1 | 4/2010 | Edwards et al. | |
| 2010/0114405 A1* | 5/2010 | Elston | B66F 9/0755 701/2 |
| 2010/0157736 A1 | 6/2010 | Riordan et al. | |
| 2015/0057843 A1 | 2/2015 | Kraimer et al. | |
| 2016/0223655 A1 | 8/2016 | Weiss et al. | |
| 2018/0105033 A1 | 4/2018 | Schnapp et al. | |
| 2018/0105215 A1 | 4/2018 | Schnapp et al. | |
| 2018/0208258 A1 | 7/2018 | Lynn et al. | |

FOREIGN PATENT DOCUMENTS

| | | |
|---|---|---|
| EP | 1560143 A2 | 8/2005 |
| GB | 1 548 307 A | 7/1979 |
| GB | 1548307 | 7/1979 |
| JP | H07138000 A | 5/1995 |
| JP | 2002104800 A | 4/2002 |
| WO | 8702484 A1 | 4/1987 |
| WO | 02054215 A1 | 7/2002 |
| WO | 2012/115920 A2 | 8/2012 |
| WO | 2012139575 A1 | 10/2012 |
| WO | 2018075013 A1 | 4/2018 |

OTHER PUBLICATIONS

Carelli, et al., Corridor Navigation and Wall-Following Stable Control for Sonar-Based Mobile Robots, Robotics and Autonomous Systems, 2003, 45(3-4):235-247.

Duff, et al., Automation of an Underground Mining Vehicle Using Reactive Navigation and Opportunistic Localization, In Proceedings 2003 IEEE/RSJ International Conference on Intelligent Robots and Systems (IROS 2003)(Cat. No. 03CH37453), vol. 4, pp. 3775-3780.

Duff, et al., Wall Following with Constrained Active Contours, Field and Service Robotics, Star 24, 2006, pp. 51-60.

Dunbabin, et aL, Autonomous Excavation Using a Rope Shovel, Journal of Field Robotics, 2006, 23(6-7):379-394.

Durrant-Whyte, et al., Field and Service Applications—An Autonomous Straddle Carrier for Movement of Shipping Containers—From Research to Operational Autonomous Systems, IEEE Robotics & Automation Magazine, 2007, pp. 14-23.

Gaertner, et al., A Modular Control Station for Semiautonomous Mobile Systems, In Proceedings of the Intelligent Vehicles' 94 Symposium, IEEE, 1994, pp. 405-410.

Garibotto, et al., Industrial Exploitation of Computer Vision in Logistic Automation: Autonomous Control of an Intelligent Forklift Truck, In Proceedings of the 1998 IEEE International Conference on Robotics and Automation, pp. 1459-1464.

Garibotto, et al., Computer Vision Control of an Intelligent Forklift Truck, In Proceedings of Conference on Intelligent Transportation Systems, IEEE, 1997, pp. 589-594.

Graefe, et al., Robot Navigation Without Calibration, In Proceedings of 2004 IEEE/RSJ International Conference on Intelligent Robots and Systems, pp. 3779-3784.

Karlsson, et al., A Capacitive Sensor for the Detection of Humans in a Robot Cell, In 1993 IEEE Instrumentation and Measurement Technology Conference, pp. 164-166.

Kelly, et al., An Infrastructure-Free Automated Guided Vehicle Based on Computer Vision—An Effort to Make an Industrial Robot Vehicle that Can Operate without Supporting Infrastructure, IEEE Robotics & Automation Magazine, 2007, pp. 24-34.

Kochan, Robotic Production Assistants for Working Alongside the Human Operator, Assembly Automation, 2002, 22 (1):26-28.

Kontz, et al. Position/Rate Haptic Control of a Hydraulic Forklift, In ASME 2003 International Mechanical Engineering Congress and Exposition, pp. 801-808.

Lang, Evaluation of an Intelligent Collision Warning System for Forklift Truck Drivers in Industry, In International Conference on Digital Human Modeling and Applications in Health, Safety, Ergonomics and Risk Management, 2018, pp. 610-622.

Larsson, et al., Laser-Based Corridor Detection for Reactive Navigation, Industrial Robot: An International Journal, 2008, 35(1):69-79.

Lecking, et al., Variable Pallet Pick-Up for Automatic Guided Vehicles in Industrial Environments, In 2006 IEEE Conference on Emerging Technologies and Factory Automation, pp. 1169-1174.

(56) References Cited

OTHER PUBLICATIONS

Mehta, Robo 3.1 An Autonomous Wall Following Robot, May 1, 2008, 34 pages.
Meng, et al., Wall-Following by an Autonomously Guided Vehicle (AGV) Using a New Fuzzy-I (Integration) Controller, Robotica, 1999, 17(1):79-86.
Mitsou, et al., Visuo-Haptic Interface for Teleoperation of Mobile Robot Exploration Tasks, In the 15th IEEE International Symposium on Robot and Human Interactive Communication, 2006, pp. 157-163.
Mora, et al., Factory Management and Transport Automation, In 2003 IEEE Conference on Emerging Technologies and Factory Automation Proceedings, pp. 508-515.
Pacchierotti, et al., Evaluation of Passing Distance for Social Robots, In the 15th IEEE International Symposium on Robot and Human Interactive Communication, 2006, pp. 315-320.
Walter, et al., A Situationally Aware Voice-commandable Robotic Forklift Working Alongside People in Unstructured Outdoor Environments, Journal of Field Robotics, accepted 2014, 32(4):590-628.
Tsui, et al., Soft-Computing-Based Embedded Design of an Intelligent Wall/Lane-Following Vehicle, IEEE/ASME Transactions on Mechatronics, 2008, 13(1):125-135.
Raymond, Wire Guidance, Maintenance Manual, Sep. 1, 1995, 53 pages.
Roberts, et al., Reactive Navigation and Opportunistic Localization for Autonomous Underground Mining Vehicles, Information Sciences, accepted 2001, 145(1-2):127-146.
Saleh, et al., Soft Computing Techniques in Intelligent Wall Following Control for a Car-Like Mobile Robot, In 2009 3rd International Conference on Signals, Circuits and Systems, pp. 1-6, IEEE, 2009.
Scheidig, et al., Generating Persons Movement Trajectories on a Mobile Robot, In the 15th IEEE International Symposium on Robot and Human Interactive Communication, 2006, pp. 747-752.
Seraji, et al., Behavior-Based Robot Navigation on Challenging Terrain: A Fuzzy Logic Approach, IEEE Transactions on Robotics and Automation, 2002, 18(3):308-321.
Shackleford, et al., Performance Evaluation of Human Detection Systems for Robot Safety, Journal of Intelligent & Robotic Systems, 2016, 83(1):85-103.
Sisbot, et al., Implementing a Human-Aware Robot System, In the 15th IEEE International Symposium on Robot and Human Interactive Communication, 2006, pp. 727-732.
Tews, et al., Autonomous Hot Metal Carrier, In 2007 IEEE International Conference on Robotics and Automation, pp. 1176-1182.

* cited by examiner

FLOOR CONVEYOR

CROSS-REFERENCE TO RELATED APPLICATIONS

The application claims the priority benefit of EP 16179516.6 filed Jul. 14, 2016, the contents of which is hereby incorporated by reference as if set forth in its entirety.

TECHNICAL ART

The present application relates to a floor conveyor according to claim 1.

BACKGROUND ART

It is known through the document WO 2012/115920 A2 of material handling vehicles to automatically implement steer maneuvers when entering one or more zones proximate the vehicle. The technique according to this document uses several sensors, for example seven obstacle sensors, to detect objects.

SUMMARY OF THE INVENTION

The present disclosure provides an improved floor conveyor compared to the prior art. This is achieved by a floor conveyor comprising a sensor device and a control unit, wherein the control unit may be operable to control the travel functions of the floor conveyor, wherein the sensor device may be arranged to be able to provide the control unit with sensor data, and wherein the sensor device may be arranged such that it can detect objects in a plane. The plane may extend along a first side of the floor conveyor. The plane comprises a follow section and a steer away section, wherein the floor conveyor when in travel is arranged to follow the object when a predetermined object is detected in the follow section, by being arranged to move in a straight line, for example, and being arranged to steer away from the object if detected in the steer away section, and steer towards the predetermined object if not detected in the steer away section and the follow section, wherein the floor conveyor thereby may be arranged to be operable to follow an object on one side of the floor conveyor by means to control the travel function from the control unit, wherein the floor conveyor may be arranged to be able to independently by means of a search mode make a choice of which predetermined object to follow, wherein the choice of object may be made by providing a search mode by extending the plane outside the follow section with a search section and thereby determine if an object is positioned outside the follow section and when the object is detected, the floor conveyor may be arranged to follow the object when in travel.

By having a sensor device that can detect on a first and a second side of the floor conveyor, a considerable improvement over the prior art may be achieved. To handle many sensor devices requires a complex structure of hardware and software. Having many sensor devices in general allows for improved sensing because more detection can be performed. Furthermore, according to the above statements, the floor conveyor may be particularly easy to operate. By applying the search mode, the operator can be more effective, as the choice of object to follow can be made without specific interaction from the operator. The floor conveyer needs only to be positioned roughly in a desired position and the floor conveyor applies the search mode. This is then made without the operator needing to make complex interactions with the user interface of the floor conveyor.

According to a further aspect of the floor conveyor, the search mode comprises the ability to extend the plane by a predetermined distance, on the first side and a second side of the floor conveyor, and the floor conveyor may be arranged to follow an object on the side which is detected inside the predetermined distance.

By applying a predetermined distance to the search mode it may be possible for the operator to interact such that the floor conveyor chooses a specific object. This is made by positioning the floor conveyor within the predetermined distance, and the floor conveyor in an automatic manner can choose, for example, the closest object. This is favorable as the operator can already have left an operator platform for an order picker operation, and the floor conveyor may then, independently of the operator, determine the object to follow by the position of the floor conveyor.

According to a further aspect of the floor conveyor, the search mode can comprise the ability to extend the plane outside the follow section in a stepwise procedure such that the extension is made by cumulative addition of a new section onto the previous section. In some embodiments, this stepwise procedure may be made by extending the plane alternately to the second side and third side of the floor conveyor.

By performing an alternating search mode the floor conveyor can, in an automatic manner, determine which object to follow. Thus a choice of side of a warehouse aisle can be made by the floor conveyor.

According to a further aspect of the floor conveyor, the floor conveyor can be arranged to follow the detected object at a predetermined distance, wherein the floor conveyor is arranged to determine the distance to be the current position from which the object is detected to be followed, or determine the distance to be a predetermined distance that has been stored on the control unit of the floor conveyor, and/or determine the distance based on operator identification data provided by an operator and relate this to a stored value of the distance.

When an object has been determined to be followed by the floor conveyor, a further aspect is on which distance the object is to be followed. By arranging the floor conveyor according to the further aspect, it may be considerably simplified on which distance the floor conveyor is able to follow the object. This is also a considerable simplification for the operator, who may no longer need to interact when determining the distance, other than the aspect of positioning the floor conveyor at a desired distance for that option.

According to a further aspect of the floor conveyor, the floor conveyor may be arranged to be able to be controlled by a remote control device.

By arranging the floor conveyor so that it is able to be controlled by a remote control device, the floor conveyor may become more versatile. It may not be needed to modify the floor conveyor if a remote control device is provided.

According to a further aspect of a floor conveyor, the sensor device may be mounted at an angle with regard to the horizontal plane, wherein the plane may be extending at an angle when compared with the horizontal plane.

By mounting the sensor device at an angle to the horizontal plane, a convenient way of monitoring a larger volume and area may be achieved. The use of one or more sensors makes it possible to monitor essentially the complete front of the floor conveyor opposite a load carrier of it. The angle of the sensor may make it possible to more freely choose the position of the sensor device.

According to a further aspect of a floor conveyor, the sensor device may be mounted at a predetermined distance from the surface on which the floor conveyor is supported, wherein this distance may be sufficient for the sensor device to detect objects on the first side and a section of the second side, and in some embodiments also sufficient to detect an object on a section of a third side of the floor conveyor.

The predetermined distance provides that the sensor can detect at a further range than if the detecting device would be mounted adjacent the surface on which the floor conveyor is supported. And further the sensor device may be more protected from soiling. It may also be less likely to be damaged if contacted. Further, it may be easier to service and keep clean.

According to a further aspect of a floor conveyor, the first side may be positioned opposite a load carrier on the floor conveyor, perpendicular to a central symmetry line of the floor conveyor.

The side opposite the load carrier may be, in general, the front of the floor conveyor, where it may be most important to monitor for objects when the floor conveyor is moving.

According to a further aspect of a floor conveyor, the sensor device may be mounted in a central position on the longitudinal symmetry line of the floor conveyor.

With a central position it may be even easier to only implement a single sensor device for detecting more than one section of a side of the floor conveyor. It may also be easy to implement the first configuration and the second configuration of the plane with a high accuracy and good quality.

According to a further aspect of a floor conveyor, the sensor device may be a laser sensor.

A laser sensor may be particularly reliable and easy to configure. They are not as easily disturbed by, for example, the use of pressurized air usage, as ultra sound detectors may be prone to.

According to a further aspect of a floor conveyor according to the above, the side on which the floor conveyor is arranged to search for and follow an object can be positioned essentially perpendicular to the first side.

In some embodiments, the floor conveyor may be able to follow an object extending essentially in parallel with the longitudinal central symmetry line of the floor conveyor.

It is further proposed, a floor conveyor according to the above, the plane can further comprise a stop section, wherein the floor conveyor may be arranged such that if an object is detected in the stop section, the floor conveyor is stopped by control of the travel function from the control unit upon receipt by it of a sensor data indicating the object is positioned in the stop section. In some embodiments, the stop section is also extending along a section of a first side and a second side of the floor conveyor, and in some embodiments also along a third side of the floor conveyor, where the stop section may be positioned inside the steer away section closest to the floor conveyor.

It is further proposed, a floor conveyor according to any of the above the stop section can further include, in an extension that can alter between a first configuration and a second configuration, wherein the first configuration, the stop section has a side that has an angled side to the central symmetry line of the floor conveyor, such that the stop section discloses a wedge shape with a narrowing width away from the floor conveyor in perpendicular direction to the central symmetry line, wherein the second configuration discloses a shape with a constant width perpendicular to the symmetry line of the floor conveyor, in some embodiments, the steer away section may have a reversed wedge shape with regard to the stop section such that the floor conveyor facing side of it may be angled to the central symmetry line.

By having two configurations it may be possible to adapt the floor conveyor, such that, for example, an order picking operation can be optimized. The wedge shape provides that the operator can move closer to the floor conveyor without a stop of the floor conveyor being induced. This is particularly important if the operator is controlling the floor conveyor with a remote control. Then, if the operator is moving outside the floor conveyor for order picking as the floor conveyor is moving, he may be more effective as the stop section is narrower. At the same time, the stop section can have a second configuration where the area where the floor conveyor stops may be broader in width. This is important when other persons than the operator is moving close to the floor conveyor. It may then be more important that the floor conveyor stops earlier. In some situations it may be beneficial for the steer away section to have a mirrored wedge shape to stop the section on the side with the first configuration.

It is further proposed, a floor conveyor as proposed according to any aspect above and further comprising a remote control device, wherein the remote control device may be arranged to be able to control the travel function of the floor conveyor, wherein the floor conveyor may be arranged to only be able to activate the travel function and follow a detected object when it receives a continuous command from the remote control device, in lack of a continuous signal from the remote control device, the floor conveyor may be arranged to stop unless the floor conveyor receives another command from an on-board control device of the floor conveyor.

The floor conveyor system comprising both a floor conveyor and a remote control device may be compatible with each other, as combining the ability for a floor conveyor to follow an object with a very simple remote control device can allow, for example, only travel and stop. The need for steering the floor conveyor by the remote control may thereby not be needed as the floor conveyor chooses an object to follow and the operator only needs to control start and stop of the floor conveyor.

It is further proposed a method of operation of a floor conveyor according to the above, comprising the steps of: applying a search mode to detect an object to follow, applying the search mode by alternatingly extending the plane from the sensor device to two sides of the floor conveyor, making a choice of object to follow by determining that the object that is closest to the floor conveyor is the object to follow, and following the object at a predetermined distance.

The method provides for a particularly favorable way of operating the floor conveyor. The advantages discussed above relating to the floor conveyor aspects are applicable also to the method.

It is further proposed computer software that when executed on a control unit of a floor conveyor executes the method according to the above.

By having a computer software that can execute the method it may be further possible to reproduce the method and also the behavior of the floor conveyor in a very predictable manner.

The computer software may include a program stored in a non-transitory computer-readable medium, the control unit of the floor conveyor executing the program, and the program performing the method described above.

DETAILED DESCRIPTION

The present disclosure relates to a floor conveyor comprising a sensor device for detecting objects. The floor conveyor can be any type of floor conveyor that is operable with such a sensor device. Non-limiting examples of such floor conveyors are order picker trucks, stacker trucks, pallet trucks, reach trucks, or tow tractors having a wagon or a space for material handling. The sensor device of the disclosure can detect objects that enter or are positioned within a certain distance of the floor conveyor, in a plane extending outside the floor conveyor. A floor conveyor with a sensor device according to the disclosure, can be an order picker truck that can be used with a remote control. In order to safeguard that the order picker truck does not contact objects, a sensor device may be included, when using the remote control. In general the remote control may be a wireless remote control, controlling start and stop of the movement of the floor conveyor. However, the use of a remote control is not mandatory for the disclosure.

A sensor device can define one sensor device in the context of the present disclosure. Thus a group of sensor devices should not be construed to be a sensor device. However, if the one sensor device comprises several sensor elements, for example, in order to detect in different directions it is still to be construed as a sensor device according to this disclosure. In this case it is the intention that it should not be possible to separate the sensor elements from each other, without destruction of the sensor device. In some embodiments the sensor device may be the sole sensor device on the floor conveyor that can detect objects. The objects are in general positioned outside the floor conveyor for the context of the present disclosure.

Figure 1:
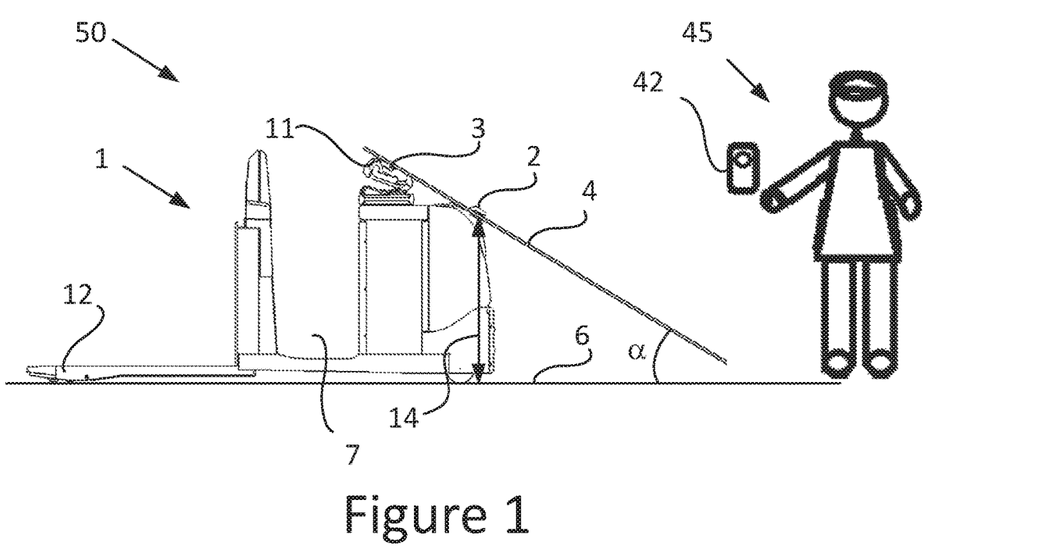
FIG. 1 shows a floor conveyor according to the present disclosure.
Figure 2:
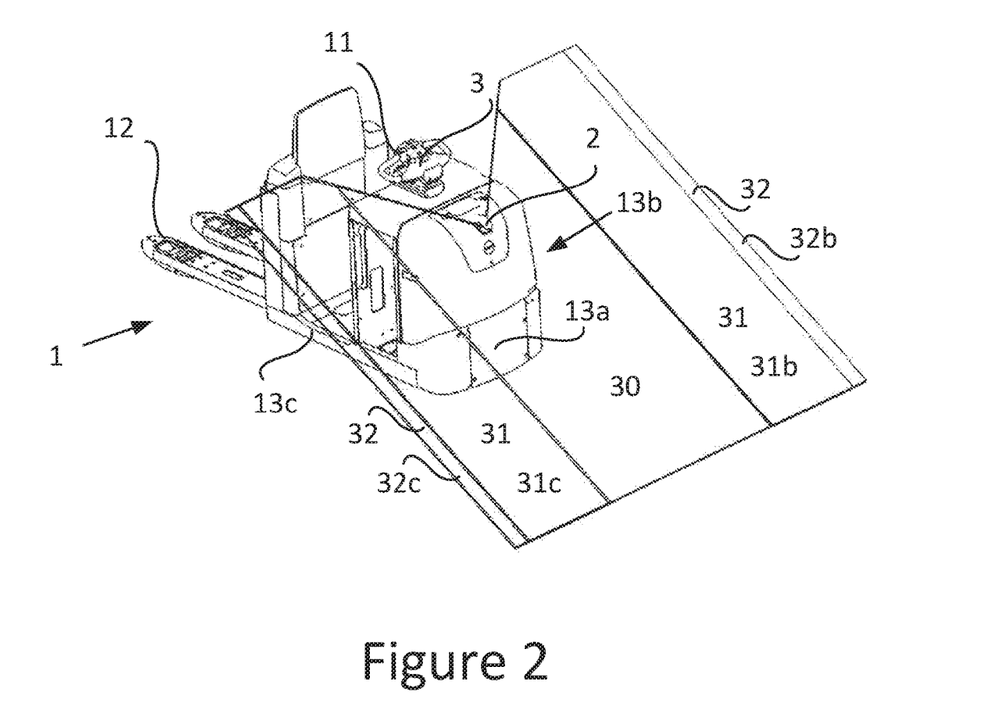
FIG. 2 shows the floor conveyor of FIG. 1 from another angle.

In FIG. 1, there is disclosed the floor conveyor 1 with the sensor device 2. The floor conveyor 1 further comprises the control unit 3 that is able to control the sensor device 2 and may also be operable to control the travel functions of the floor conveyor 1. The sensor device 2 may be detecting objects in a plane 4. The plane 4 is best viewed in FIGS. 2 and 3a, but the plane 4 can also be seen from the side in FIG. 1. The sensor device 2 may be mounted at an angle α to the horizontal plane. The range of the plane 4 may be in the lower part ended above the surface 6 on which the floor conveyor 1 may be supported. In general, the floor conveyor also comprises an operator control 11, for example, in the form of a handle 11 as seen in FIGS. 1 and 2. In general, a load carrier 12 may be present also; this can be in the form of two forks as seen in FIGS. 1 and 2, but can also be in the form of a basket, a box, or a shelf on the floor conveyor 1. Also, a trailer could be the load carrier.

The sensor device 2 may be mounted at an angle α to the horizontal plane. By adjusting the angle α, the floor conveyor can be adapted to different uses. If a smaller angle is used, the plane 4 will have a longer range on side 13a, FIGS. 2 and 10, of the floor conveyor. If a larger angle α is used, shorter extension of the plane 4 may be achieved. By the angle α, it is provided that only one sensor can be used for detection of objects supported on the surface 6 despite that the sensor device 2 can be positioned higher up on the floor conveyor 1. By having the inclined plane 4, an object entering the plane 4 from the most likely direction, i.e., from the side 13a, the object can be detected early at a low point of the plane 4. A small gap to the surface 6 can be seen in FIG. 1. The gap may be needed in order for a sensor device 2 mounted at an angle, towards the surface 6, as a constant signal may be received if no gap was present.

The sensor device 2 may be mounted at a predetermined distance 14, FIG. 1, from the surface 6. In some embodiments it may be beneficial for the distance 14 to be at the upper portion of the housing of the floor conveyor 1. It should be understood that at lower positions it may be possible, but keeping the sensor device 2 away from the surface 6 can protect it from contact. It may also be beneficial to have the sensor device 2 higher in order to be able to detect objects protruding in space and not necessarily being supported on the surface 6. In order for the sensor device 2 to detect on further sides 13b, and even side 13c, a certain distance, i.e., height over the surface 6, may be required.

The sensor device 2 may be mounted in a central position on the longitudinal symmetry line 15 of the floor conveyor 1. This is convenient as it gives good view of the surroundings.

The sensor device 2 can detect objects in the plane 4. The plane 4 can be divided into sections. This is in practice made by using time as a factor of controlling the sensor signals reflected back to the sensor. By predetermining different time ranges for reflection, different sections of the plane 4 can be used as for different actions from the control unit 3 to the floor conveyor 1.

A laser sensor 2 may be beneficial to be used as the sensor device 2. The laser sensor can be applied to monitor a plane 4 as required. Any laser sensor applicable to this may be usable. In some embodiments the laser sensor 2 can monitor more than 180 degrees in front of it, in some cases more than 240 degrees or even more than 300 degrees. This allows for detecting objects on side 13a, 13b, and 13c, see FIGS. 1-11. In particular when the sensor device 2 is mounted a bit retracted from the most protruding point of any side to be monitored, such as side 13a as seen in FIG. 1.

Figure 3A:
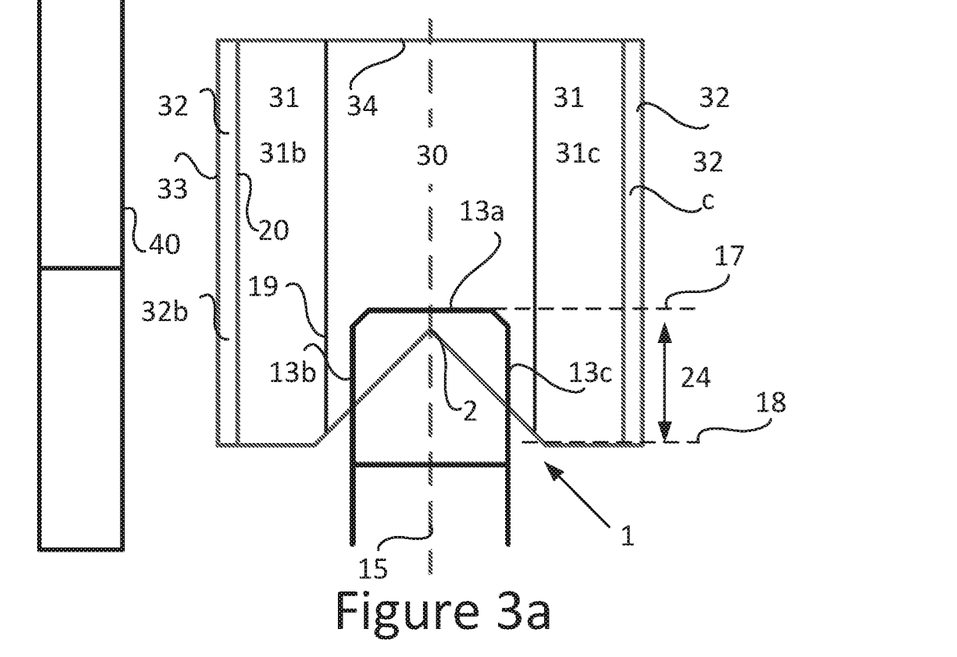
FIG. 3a shows a floor conveyor with a plane for detecting objects according to the present disclosure.

The sensor device 2 can be arranged to be able to monitor a first side 13a, a second side 13 and also a third side 13c. This can allow for the use of only one sole sensor device 2 for performing tasks that used many sensors before. In some situations it may be beneficial to be made by using a sensor that can detect in the discussed plane 4. Improvements may be achieved by mounting on the central symmetry line 15 and at a predetermined distance 14 from the surface 6 on which the floor conveyor may be supported. In general as can be seen in FIGS. 2 and 3*a*, the first side 13*a* is the transversal side that may be positioned opposite a load carrier 12. However, for obvious reasons, the first side can for the entire disclosure be chosen to be any side of the floor conveyor 1. When discussing sides it should be understood that the angled corners which are seen in FIGS. 3*a*, 3*b*, 4-7*b* and 10-11 are only examples of how a floor conveyor 1 may be designed. In general, if a determination is to be made the angled corners could be incorporated either to the first side 13*a* or to the other sides as of choice.

The plane 4, can also be referred to as a detection plane. The plane 4 can be extending along a first side 13*a* of the floor conveyor 1. The plane 4 comprises a stop section 30, wherein the floor conveyor 1 may be arranged such that if an object 41 is detected, FIG. 7*a* position D, in the stop section 30, the floor conveyor 1 may be stopped by control of the travel function from the control unit 3 upon receipt by it of a sensor data from the sensor device 2. The stop may be performed more in detail by the sensor device 2 sending a sensor data to the control unit 3, that then sends an order to a motor control unit (not shown) to stop a motor (not shown), and possibly apply a brake device (not shown).

Figure 3B:
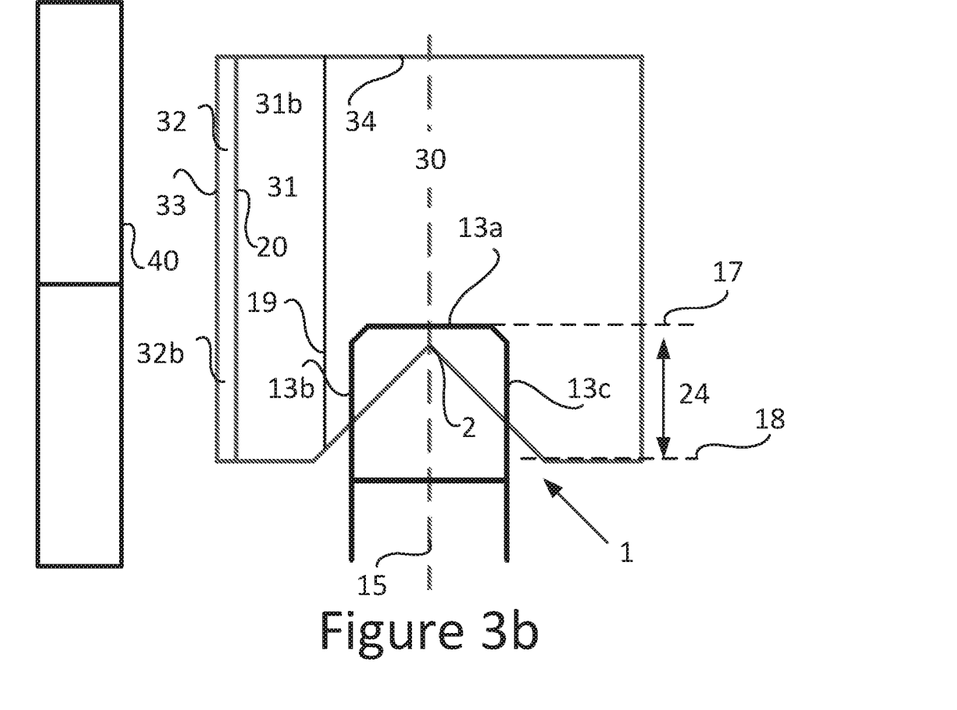
FIG. 3b shows a floor conveyor with a plane for detecting objects in another configuration according to the present disclosure.

The stop section 30 of the plane 4 may also extend along a section of a second side 13*b* of the floor conveyor 1, FIGS. 2-3*b*. The plane 4 can further comprise a follow section 32 and a steer away section 31. The floor conveyor 1 can arranged to essentially move in a straight line if an object 40 is detected in the follow section 32, and be can arranged to steer away from an object 40 if detected in the steer away section 31, wherein the floor conveyor 1 thereby may be arranged to be operable to follow an object 40 on one side 13*b*, 13*c* of the floor conveyor 1. The side on which an object to be followed may be positioned can be essentially perpendicular to the first side 13*a*, i.e. to the central symmetry line 15 of the floor conveyor. The steer away operation may be made with an angle of 5 degrees or more or less. It is also possible to use the fact that no object is detected in any of the sections 30, 31, 32, and then steer towards an object 40. However, this may only be possible if the object 40 has previously been detected.

The floor conveyor 1 may be arranged to be able to independently by means of a search mode to make a choice of which object 40 to follow. The choice of object 40 may be made by providing a search mode by extending the plane 4 outside the follow section 32 with a search section 32*x*, 32*a*-*e*, and thereby determine if an object 40 is positioned outside the follow section 32 and if an object 40 is detected, the floor conveyor 1 may be arranged to follow this object 40, when in travel. The follow function is in general arranged on the floor conveyor 1 so when the object 40 is detected, the floor conveyor 1 follows the object by moving in a generally straight line as long as the object is in the follow section 32, see FIG. 7*a* position A. As the floor conveyor 1 moves forward it might happen that the object 40 may be positioned within the steer away section 31. The floor conveyor 1 may then steer away from the object 40, see position B in FIG. 7*a*, such that the object will again be positioned in the follow section 32, see position C in FIG. 7*a*. If the object instead after choice of object 40 to follow, is not detected in the follow section 32 and not in the stop section 30 or the steer away section 31, the floor conveyor 1 may be arranged to steer towards the object 40, FIG. 7*b* position B1. As discussed above, the steer away and the steer towards operations may be made with small angles, e.g., 5 degrees to the longitudinal extension of the object or aisle, although other angles are contemplated.

The disclosed configuration of FIGS. 2-3*b* with a follow section 32*b* alongside 13*b* and a follow section 32*c* alongside 13*c* is an example. It is explained below that it may also be possible to only have a follow section 32*b*, 32*c*, and also a steer away section 31*b*, 31*c* only on the side on which the object to be followed is present. Thus in general it should be understood that as the object to be followed has been chosen, the floor conveyor 1 may only have a follow section 32 and a steer away section 31, on the side of the floor conveyor 1 on which the current object 40 that is followed and is positioned. On the other side it may be beneficial to have only the stop section 30 present. See FIG. 3*b* or FIGS. 8-9.

The search mode can comprise the ability to extend the plane 4 by a predetermined distance, in some embodiments on two sides at least, for example the second side 13*b* and the third side 13*c* of the floor conveyor 1. The floor conveyor 1 may be arranged to follow an object 40 on the side 13*b*, 13*c* which may be detected inside the predetermined distance. In some embodiments a predetermined distance may be set in the parameters of the control unit 3 of the floor conveyor 1. The operator 45 can then position the floor conveyor 1 within the known distance corresponding to the predetermined distance, to an object 40 that the operator wants the floor conveyor 1 to be able to follow. As the floor conveyor 1 is arranged to search within the predetermined distance it can find the object due to the positioning of the floor conveyor 1, and can be arranged to follow the object 40 according to the description above. The predetermined distance can be seen as an example in FIG. 6, for side 13*b*, but the same is of course applicable for another side as side 13*c*.

Figure 4:
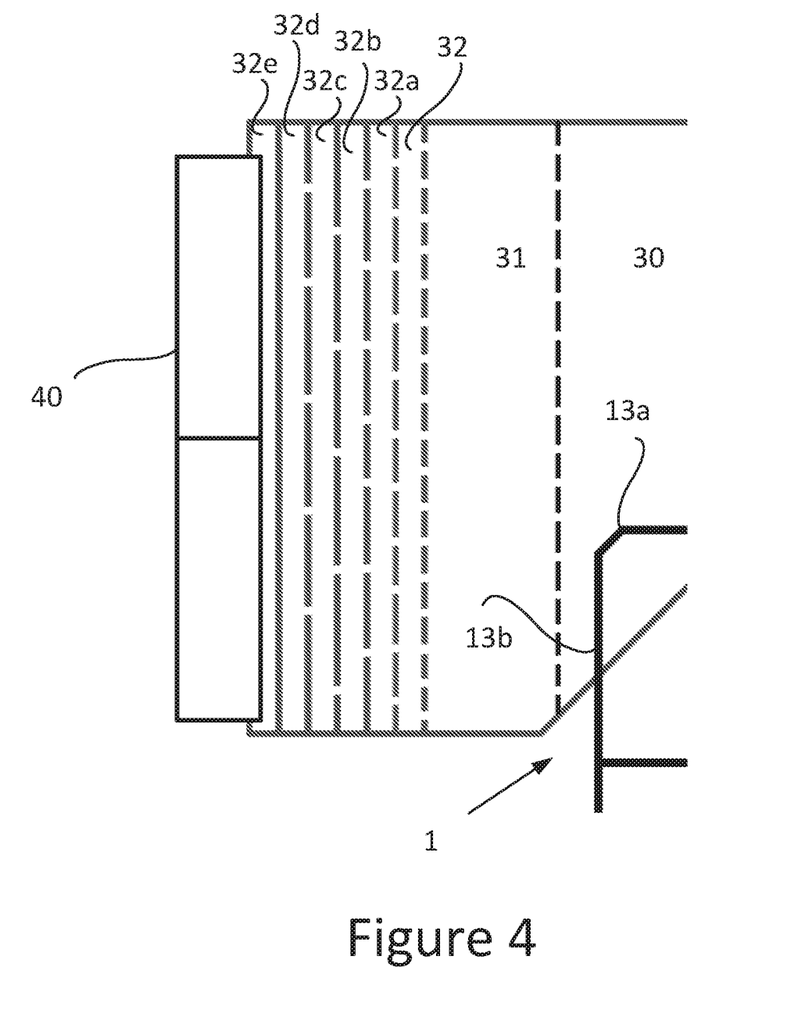
FIG. 4 shows a section of a floor conveyor with sections of a plane for detecting objects according to a search mode for detecting an object, according to the present disclosure.
Figure 5:
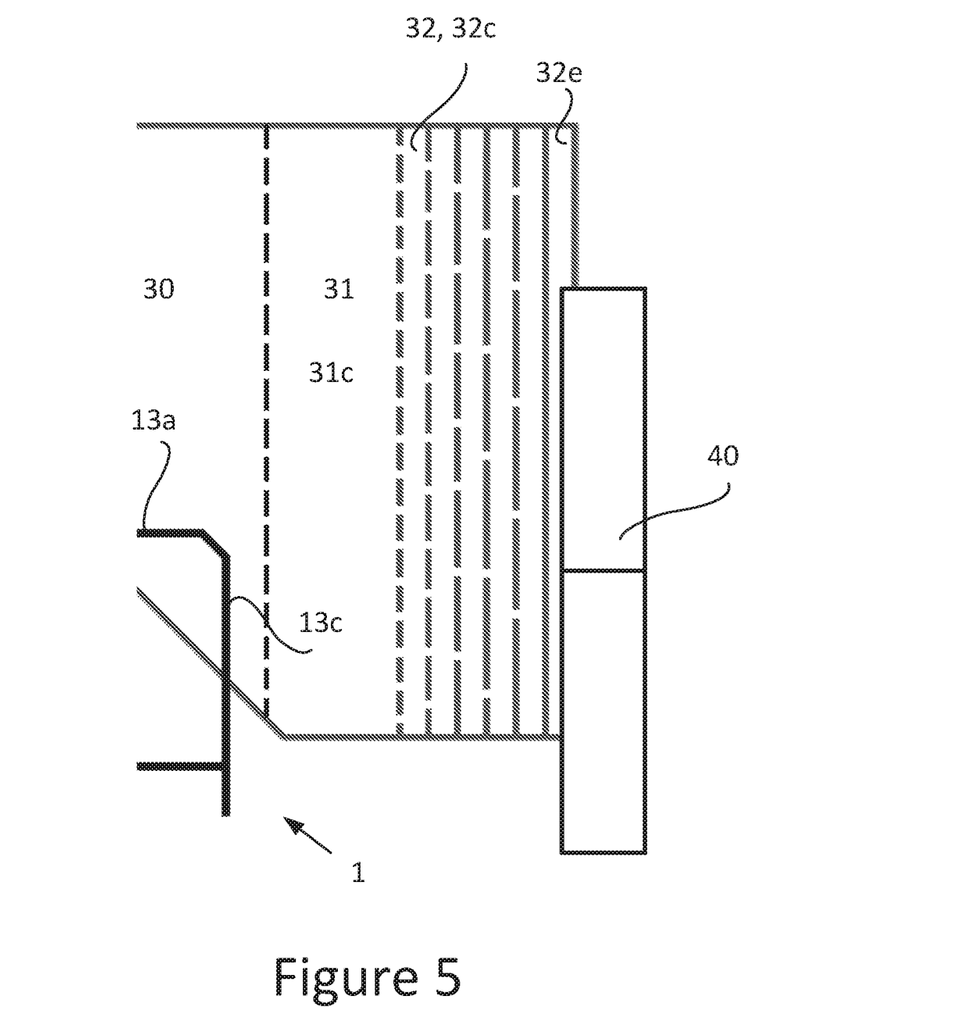
FIG. 5 shows a section of a floor conveyor with sections of plane for detecting objects according to a search mode for detecting an object, according to the present disclosure.
Figure 6:
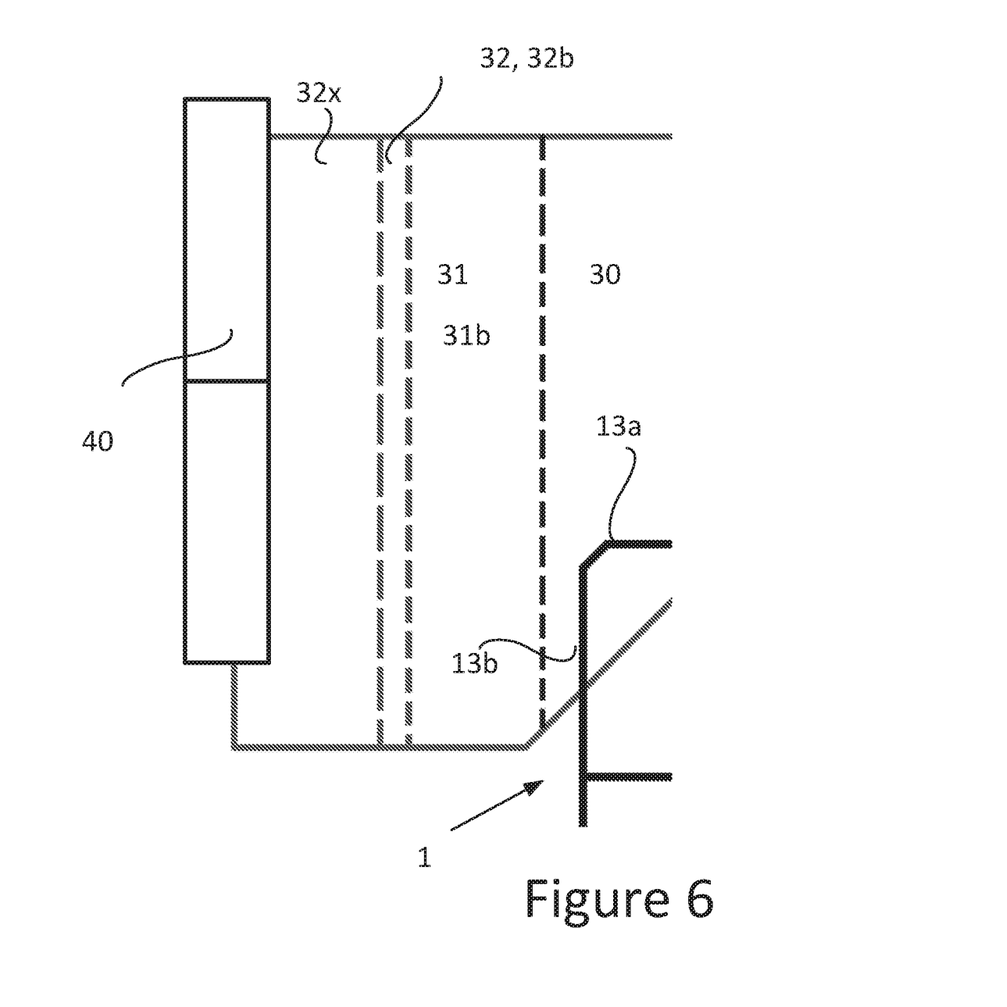
FIG. 6 shows a section of a floor conveyor with a section of a plane for detecting objects according to a search mode, according to the present disclosure.
Figure 7A:
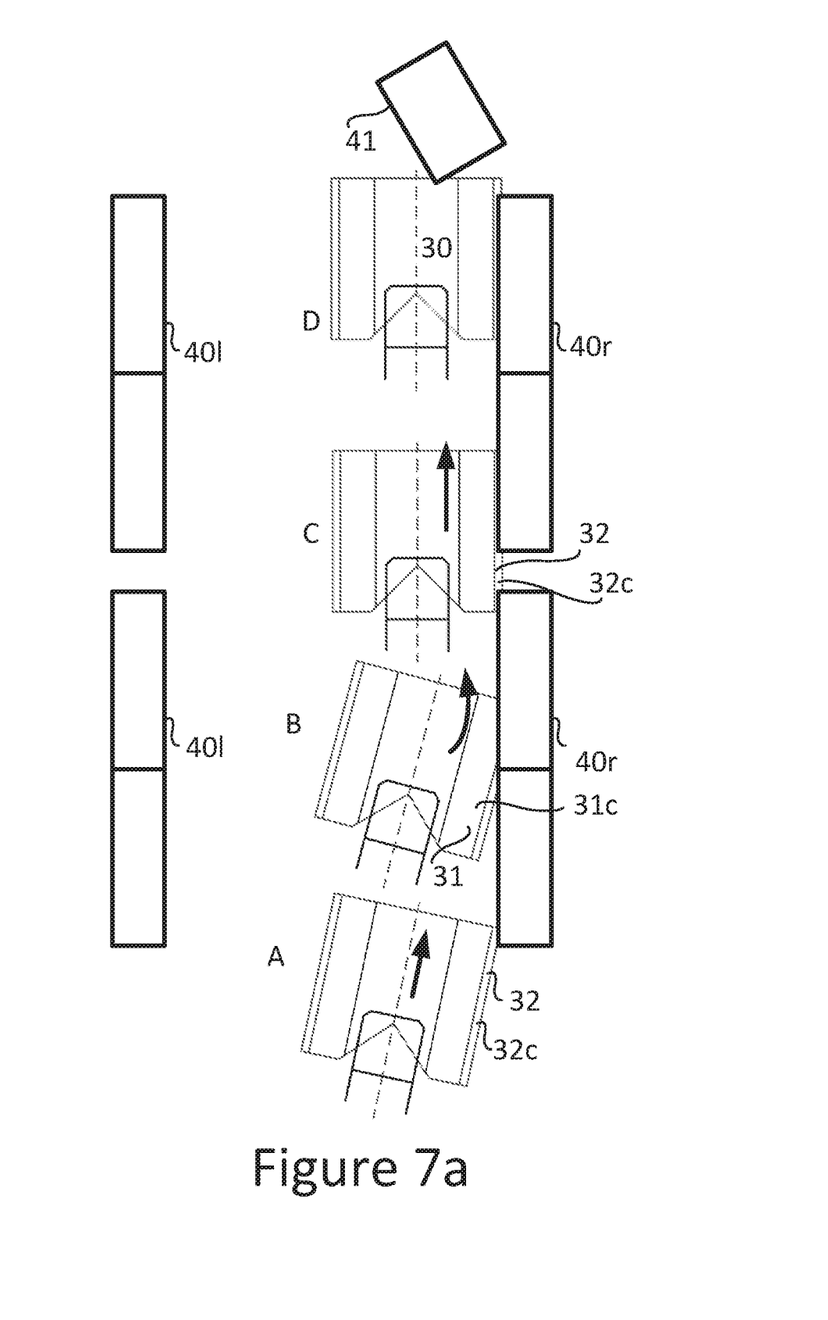
FIG. 7a shows an operation of a floor conveyor according to the present disclosure.
Figure 7B:
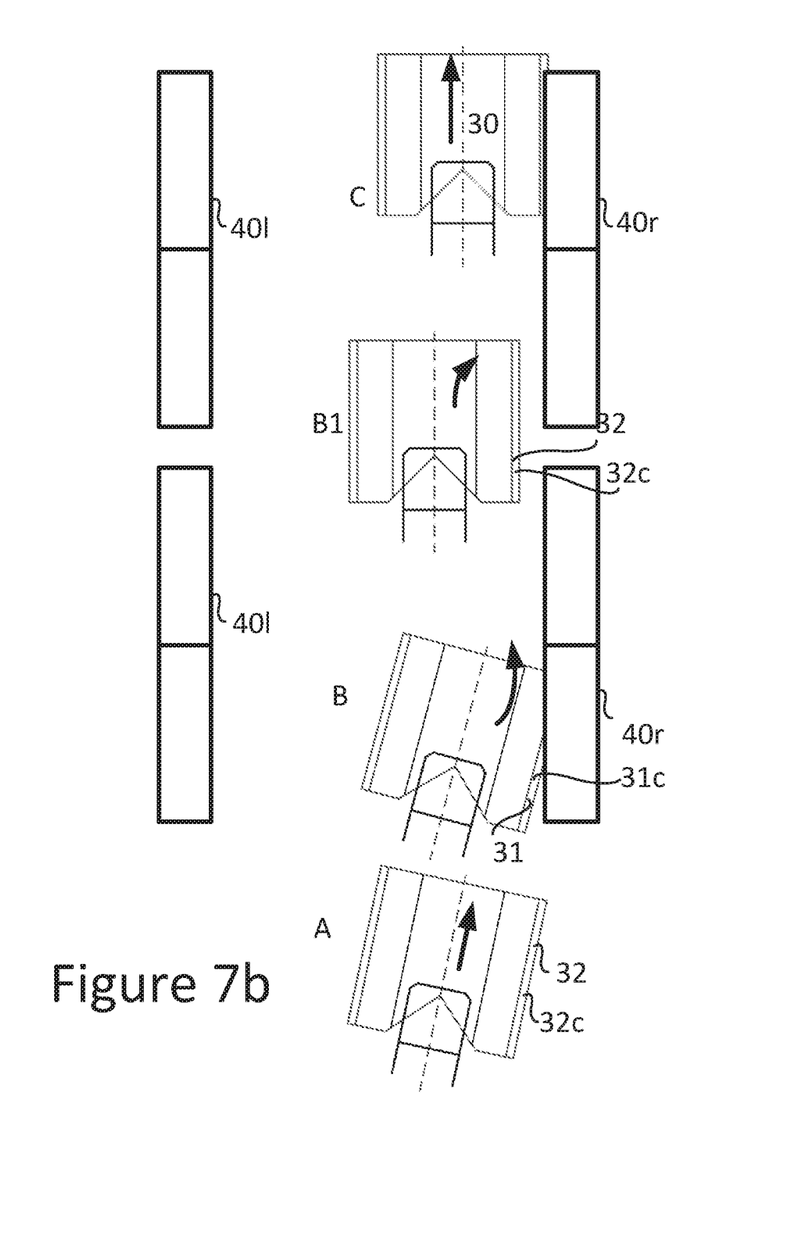
FIG. 7b shows an operation of a floor conveyor according to the present disclosure.
Figure 8:
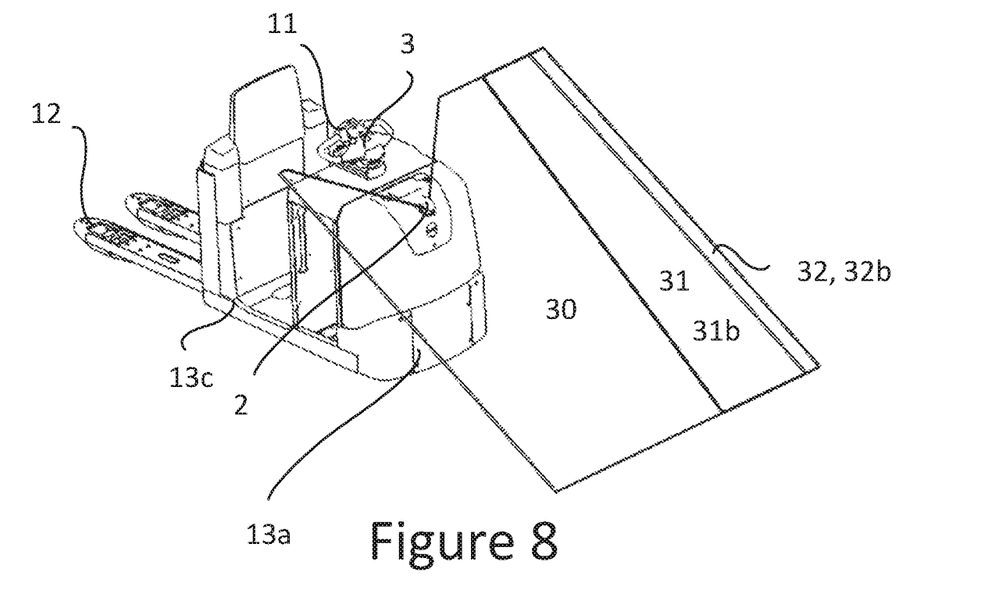
FIG. 8 shows an alternative configuration of the plane as shown in FIG. 1.
Figure 9:
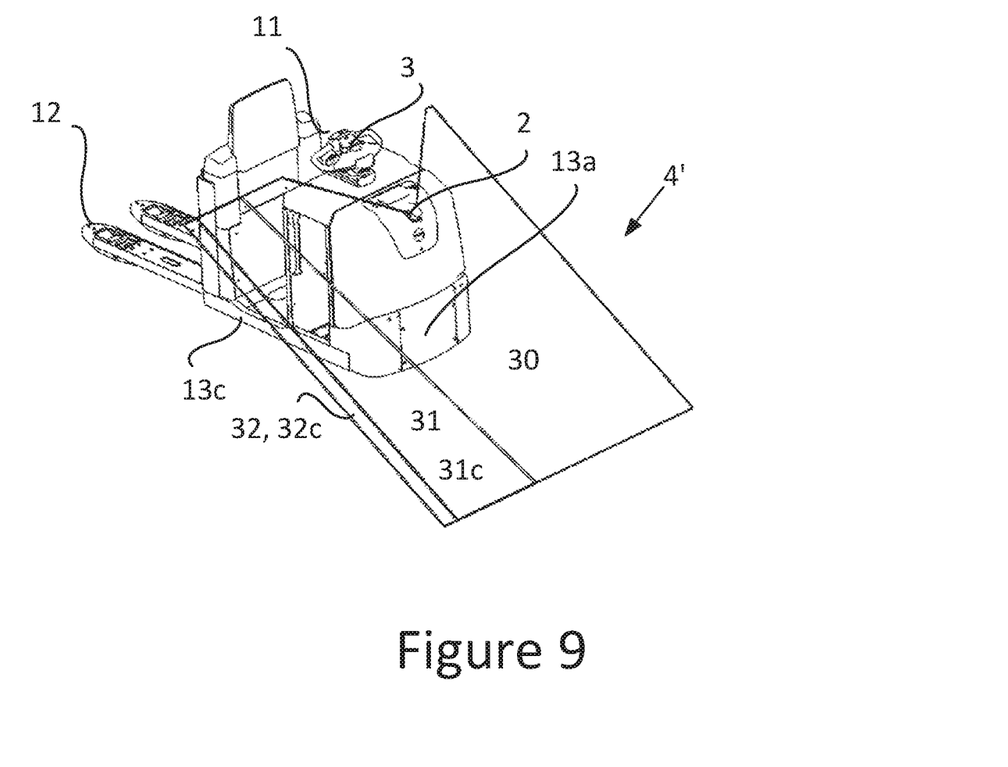
FIG. 9 shows an alternative configuration of the plane as shown in FIG. 1.

The search mode can alternatively comprise the ability to extend the plane 4 outside the follow section 32 in a stepwise procedure 32*a*-*e* such that the extension may be made by cumulative addition of a new section onto the previous section, as disclosed in FIGS. 4-5. In some situations it may be beneficial for this stepwise procedure to be made by extending the plane 4 alternately to two sides, such as the second side 13*b* and third second side 13*c* of the floor conveyor 1. By this search mode the floor conveyor 1 may determine the position of the object to follow 40 in automatic manner. The first object found on any side 13*b*, 13*c* of the floor conveyor 1 can be the object 40 to follow. In some embodiments, the object 40 may be followed at the distance that the object 40 was found. But it can be followed on a pre-set distance also. For example in FIG. 7*a* one can see that the object 40*r* is followed, and object 40*l* on the other side of the aisle is not followed.

For all aspects of discussed search modes after the object 40, 40*l*, 40*r*, is detected, the floor conveyor 1 may be arranged to follow the detected object 40 at a predetermined distance. The distance determined can be preconfigured with the floor conveyor 1 to be the current position from which the object 40 is detected. The distance can also be a predetermined distance that has been stored on the control unit 3 of the floor conveyor 1. The distance can also be a distance based on an operator identification data provided by an operator and can be related to a stored value of the distance. It is thus possible to arrange the floor conveyor 1 to make a choice also at which distance to follow the object 40.

The predetermined distance at which the floor conveyor 1 can/will follow the object 40, may reflect on how the follow section 32 is positioned with regard to the side 13*b*, 13*c* on the floor conveyor 1. A smaller distance may be reflected as a follow section 32 that is positioned closer to the side of the floor conveyor 1 on which the object 40 to be followed is positioned.

The floor conveyor 1 may be advantageously arranged to be able to be controlled by a remote control device 42. By arranging the floor conveyor 1 so that it is able to be controlled by a remote control device 42, the floor conveyor 1 becomes more versatile. It may not be needed to modify the floor conveyor if a remote control device is provided. The modification may include the sensor device 2 because a remote control 42 may require that the floor conveyor 1 can detect objects.

FIGS. 8, 9, 10 and 11 disclose alternative configurations of the plane 4' from above. The plane has an outer contour that may be limited by predetermined borders comprising sides 21, 33 and the side 34. The plane comprises an alternative stop section 30'. As with plane 4 above, the stop section may never be larger in area than the plane 4', it may be beneficial to be smaller than the complete coverage of the plane 4'. As described above, if an object 40 is detected inside the alternative stop section 30 the floor conveyor 1 may be arranged to stop travel movement as discussed above. The stop may be performed by the sensor device 2 sending a sensor data to the control unit 3, that then sends an order to a motor control unit (not shown) to stop the motor, and possibly apply a brake device. The alternative plane 4' may extend along a first side 13a of the floor conveyor 1. As can be seen in the FIGS. 2 and 3a, the side 13a may be the transversal side that is positioned opposite the load carrier 12. A perpendicular side 13b to the first side 13a may project along the longitudinal extension of the floor conveyor 1. This is the normal shape of a floor conveyor 1. Of course it should be understood that perpendicular does not mean that the first side 13a and the second side 13b are straight, the sides can be curved and perpendicular means that the two sides intersect at an angle, and are not parallel to each other.

Figure 10:
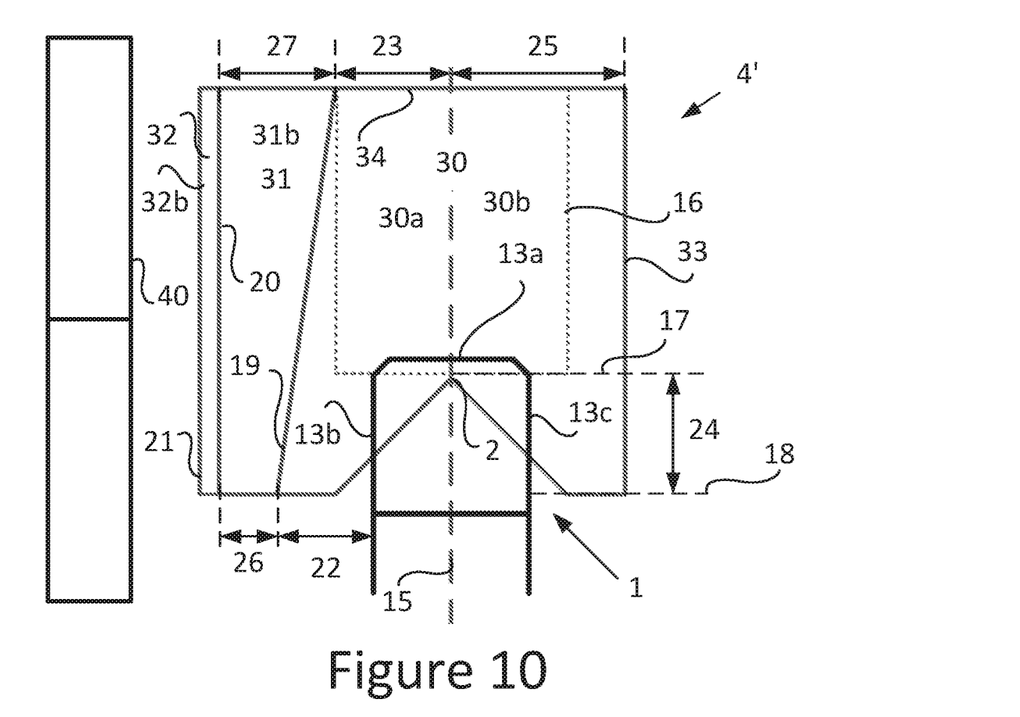
FIG. 10 shows the plane of FIG. 8, shown from above.
Figure 11:
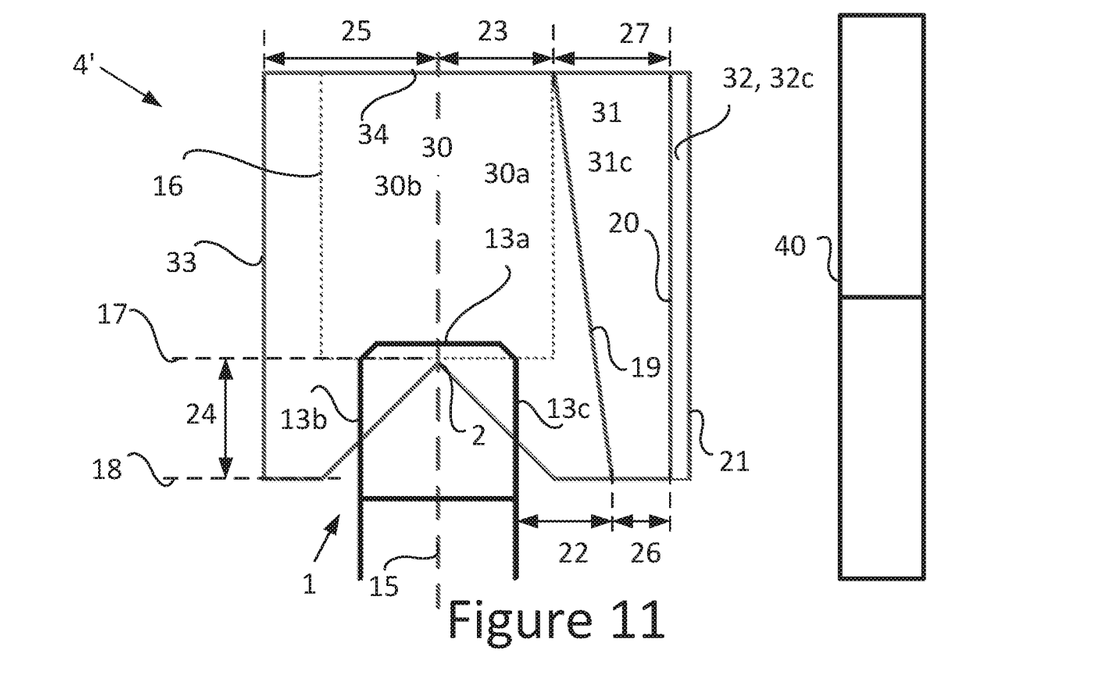
FIG. 11 shows the plane of FIG. 9, shown from above.

The alternative shape of the stop section 30' can be seen in FIGS. 10 and 11. A wedge shape is present and can be seen to be limited by outer end in a form of the line, i.e., side 19. The shape of this part of the alternative stop section 30' is thus angled to the central symmetry line 15 and has a narrowing width away from the floor conveyor 1, in perpendicular direction to the central symmetry line 15. The stop section 30' is disclosing two configurations 30a, 30b. The configuration 30a discloses the wedge shape to the central symmetry line 15. The configuration 30b discloses a constant width from the central symmetry line 15 to the outer end 33 of the stop section 30'. The configuration 30b discloses a larger area outside the sides 13a, 13b and 13c where a stop will be implemented if an object is detected in this configuration.

It is to be understood that it is in general so that the first configuration 30a and the second configuration 30b are subsections to the stop section 30'. Two first configuration sections 30a may be active at the same time on respective sides of the central symmetry line 15. The same may be achievable for the second configuration 30b. However in most cases it may be desirable that the first configuration 30a and the second configuration 30b are present at the same time on a respective side of the central symmetry line 15 of the floor conveyor.

The floor conveyor 1 may be arranged to be able to alter between the first configuration 30a and the second configuration 30b. This may be advantageously done after the choice of object to be followed is made. It is of course possible that the operator manually alter the configuration of the stop section 30', but one more beneficial arrangement may be that the control unit 3 can determine on which side a predetermined object 40 is positioned by means of the sensor device 2, and apply a desired configuration 30a, 30b on different sides of the floor conveyor 1. The predetermined object 40 may generally be a rack or shelf in a warehouse, but could also be a wall, or other objects.

The plane 4 comprises a further steer away section 31', 31b', 31c', the function of the steer away section 31', 31b', 31c' fully correspond with the discussed steer away section as discussed above regarding FIGS. 2, 3, 3a, 4, 5, 6, and 7. However, as the stop section 30' has a wedge shape, the steer away section may have a reversed web shape compared with the stop section 30'. Outside the steer away section 31 and adjacent to this section, a follow section 32 may be arranged. This fully corresponds with the steer away section discussed above regarding FIGS. 2, 3a, 3b, 4, 5, 6, and 7a.

By having the steer away section 31', 31b', 31c' that is a bit larger, the operator can still maneuver the floor conveyor 1 for areas where the floor conveyor 1 otherwise would have stopped due to detecting the operator in the stop section.

For all aspects above the use of numbers 31, 31b and 31c and also 32, 32b, 32c it should be understood that 32 means the follow section in general, comprising both 32b and 32c. For example as seen in FIG. 3a, 31 means both steer away sections 31b and 31c but 31b is not the same as 31c as these two sections apply to different sides of the floor conveyor 1. The same is applicable for 32, 32b and 32c.

The disclosure also relates to a floor conveyor system 50 comprising a floor conveyor 1 according to any of the aspects above and further comprising a remote control device 42, FIG. 1. The remote control device 42 may be arranged to be able to control the travel function of the floor conveyor 1. In some embodiments the configuration of the floor conveyor 1 system is that it may be arranged to only be possible to activate the travel function and follow a detected object 40 by the floor conveyor when it receives a continuous command from the remote control device 42. In lack of a continuous signal from the remote control device 42, the floor conveyor 1 may be arranged to stop. That is of course unless the floor conveyor 1 receives command from an on-board control device 11 of the floor conveyor 1. The system 50 can combine the ability for a floor conveyor 1 to follow an object 40, 40l, 40r and a very simple remote control device can be designed that allows travel and stop. The need for steering the floor conveyor by the remote control may thereby not be needed as the floor conveyor chooses an object to follow and the operator need only control the start and stop of the floor conveyor.

Figure 12:
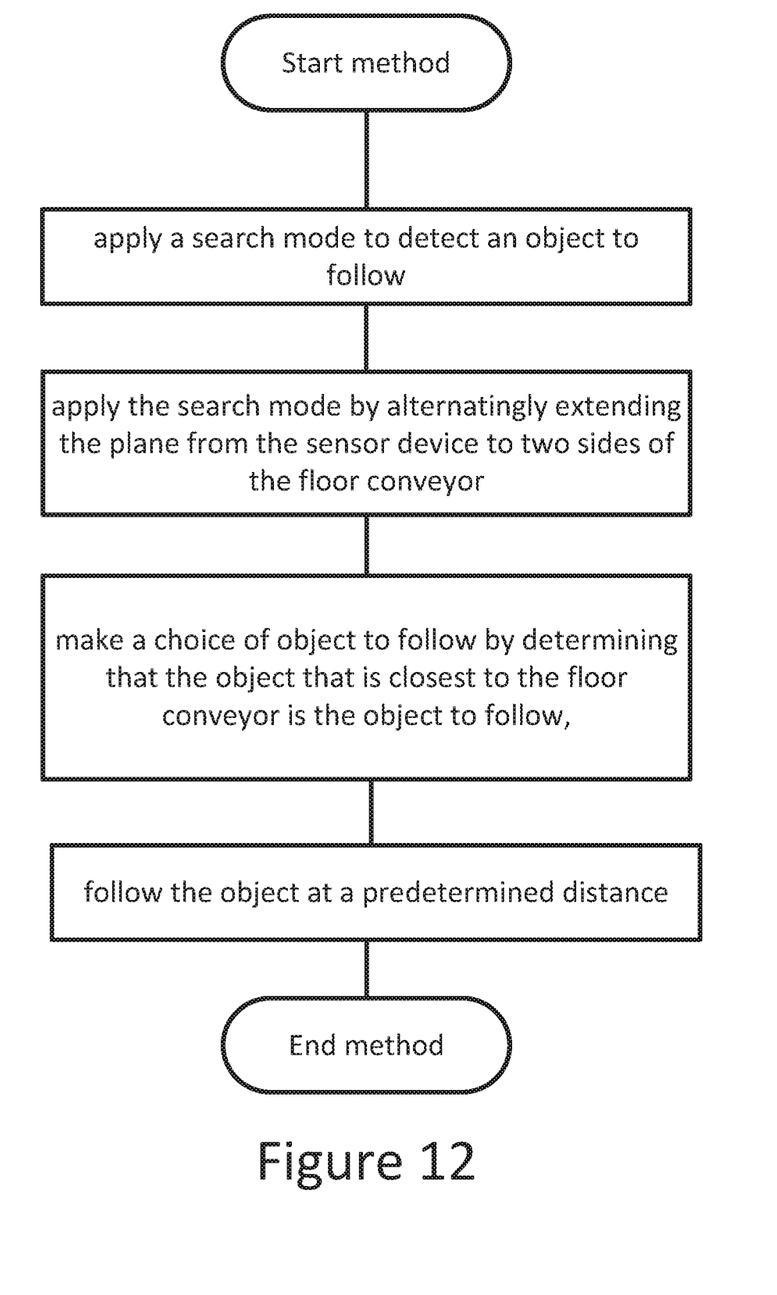
FIG. 12 shows a method according to the present disclosure.

FIG. 12 also discloses a method of operation of a floor conveyor the above:

applying a search mode to detect an object to follow, applying the search mode by alternatingly extending the plane from the sensor device to two sides of the floor conveyor, making a choice of object to follow by determining that the object that is closest to the floor conveyor is the object to follow, and following the object at a predetermined distance.

The search mode of the steps of the method can be modified in any manner with the discussed aspects regarding the floor conveyor 1 discussed above.

Further it may be advantageous that the method be performed through computer software that, when stored on and executed on a control unit of a floor conveyor, performs the method according to the above.

The present disclosure describes embodiments with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the embodiments may be combined in any suitable manner in one or more embodiments. In the description, numerous specific details are recited to provide a thorough understanding of the embodiments. One skilled in the relevant art will recognize, however, that the embodiments may be practiced without one or more of the specific details, or with other methods, components, materials, and so forth. In other instances, well-known structures, materials, or operations are not shown or described in detail to avoid obscuring aspects of the embodiments.

Although the above discussion discloses various exemplary embodiments, it should be apparent that those skilled in the art can make various modifications that will achieve some of the disclosed advantages without departing from the true scope of the disclosure.

The invention claimed is:

1. A floor conveyor comprising:
a sensor device and a control unit, wherein the control unit is operable to control a travel function of the floor conveyor, wherein the sensor device is arranged to provide the control unit with sensor data, wherein the sensor device is arranged to detect objects in a plane;
wherein the plane is to extend along a first side of the floor conveyor, the plane comprising a follow section and a steer away section, wherein the follow section is to be positioned outside the steer away section in relation to the floor conveyor, wherein the floor conveyor is arranged to:
initiate a search mode by extending the plane outside the follow section with a search section to determine that an object is positioned outside the follow section;
follow the object by moving in a straight line when the floor conveyor is traveling, based on the detection of the object within the search section;
steer away from the object based on the object being detected in the steer away section; and
steer towards the object based on the object not being detected in the steer away section and not being detected in the follow section.

2. The floor conveyor according to claim 1, wherein the search mode comprises an ability to extend the plane by a predetermined distance, on a second side and a third side of the floor conveyor, and the floor conveyor is arranged to follow the object on the side which is detected inside the predetermined distance.

3. The floor conveyor according to claim 1, wherein the search mode comprises an ability to extend the plane outside the follow section in a stepwise procedure such that the extension is made by cumulative addition of a new section onto a previous section, the stepwise procedure extending the plane alternately to a second side and a third side of the floor conveyor.

4. The floor conveyor according to claim 1, wherein the floor conveyor is arranged to follow the object at a predetermined distance, wherein the floor conveyor is arranged to determine at least one of a distance to be a current position from which the object is detected to be followed, the distance to be the predetermined distance that has been stored on the control unit of the floor conveyor, and the distance based on an operator identification data provided by an operator and relate the distance to a stored distance value.

5. The floor conveyor according to claim 1, wherein the floor conveyor is arranged to be able to be controlled by a remote control device.

6. The floor conveyor according to claim 1, wherein the sensor device is mounted at an angle $\alpha$ with regard to a horizontal plane, wherein the plane is extending at the angle $\alpha$ when compared with the horizontal plane.

7. The floor conveyor according to claim 1, wherein the sensor device is mounted at a predetermined distance from the surface on which the floor conveyor is supported, wherein the predetermined distance enables the sensor device to detect objects on the first side and a section of a second side, and
wherein the predetermined distance enables the sensor device to detect an object on a section of a third side of the floor conveyor, the sensor device mounted in a central position on a longitudinal symmetry line of the floor conveyor.

8. The floor conveyor according to claim 1, wherein the first side is positioned opposite a load carrier on the floor conveyor, perpendicular to a central symmetry line of the floor conveyor.

9. The floor conveyor according to claim 1, wherein the sensor device is a laser sensor.

10. The floor conveyor according to claim 1, wherein the side on which the floor conveyor is arranged to search for and follow an object is positioned perpendicular to the first side.

11. The floor conveyor according to claim 1, wherein the plane further comprises a stop section, wherein the floor conveyor is arranged such that based on the object being detected in the stop section, the floor conveyor is stopped by control of the travel function from the control unit upon receipt of a sensor data indicating the object being positioned in the stop section, the stop section extending along a section of a first side and a second side and a third side of the floor conveyor, the stop section positioned inside the steer away section closest to the floor conveyor.

12. The floor conveyor according to claim 11, wherein the stop section further has an extension that is to alter between a first configuration and a second configuration, wherein in the first configuration the stop section has a side that has an angled side to a central symmetry line of the floor conveyor such that the stop section discloses a wedge shape with a narrowing width away from the floor conveyor in a perpendicular direction to the central symmetry line, wherein the second configuration discloses a shape with a constant width perpendicular to the central symmetry line of the floor conveyor, and the steer away section has a reversed wedge shape with regard to the stop section such that the floor conveyor facing side of the steer away section is angled to the central symmetry line.

* * * * *